United States Patent [19]
Van Eckelen et al.

[11] 3,874,020
[45] Apr. 1, 1975

[54] WINDSHIELD WIPER UNIT

[75] Inventors: Alex H. A. M. van Eckelen; Johan H. van den Berg, both of Hasselt, Belgium

[73] Assignee: Monroe Belgium N.V., Sint-Truiden, Belgium

[22] Filed: Feb. 8, 1973

[21] Appl. No.: 330,752

[52] U.S. Cl.......... 15/250.42, 15/250.36, 15/250.38
[51] Int. Cl. .............................................. B60s 1/38
[58] Field of Search....... 15/250.36, 250.32, 250.37, 15/250.38, 250.34, 250.40, 250.41, 250.42

[56] References Cited
UNITED STATES PATENTS

| | | | |
|---|---|---|---|
| 1,370,684 | 3/1921 | Demand | 15/250.24 |
| 2,593,073 | 4/1952 | Trevaskis | 15/250.38 X |
| 2,659,097 | 11/1953 | Morton | 15/250.36 X |
| 2,964,776 | 12/1960 | Ryck | 15/250.42 |
| 3,116,509 | 1/1964 | Contant et al. | 15/250.42 |
| 3,139,644 | 7/1964 | Smith | 15/250.42 X |
| 3,390,415 | 7/1968 | Scinta | 15/250.42 |
| 3,618,155 | 11/1971 | Mower | 15/250.42 |
| 3,659,310 | 5/1972 | Rosen | 15/250.42 |

FOREIGN PATENTS OR APPLICATIONS

| | | | |
|---|---|---|---|
| 433,467 | 8/1935 | United Kingdom | 15/250.42 |

*Primary Examiner*—Peter Feldman
*Attorney, Agent, or Firm*—Harness, Dickey & Pierce

[57] ABSTRACT

A windshield wiper unit comprising a wiper assembly including a relatively flexible wiper blade, a bridge assembly disposed adjacent the wiper assembly for operatively securing the same to an associated wiper arm, the bridge assembly including first and second hingedly connected bridge sections, means connecting the opposite ends of the bridge assembly to the wiper assembly in a manner such that a downwardly and outwardly directed force exerted by the bridge assembly upon the opposite ends of the blade assembly will result in the wiper blade applying a relatively uniformly distributed wiping force along the entire length thereof against an associated windshield.

42 Claims, 17 Drawing Figures

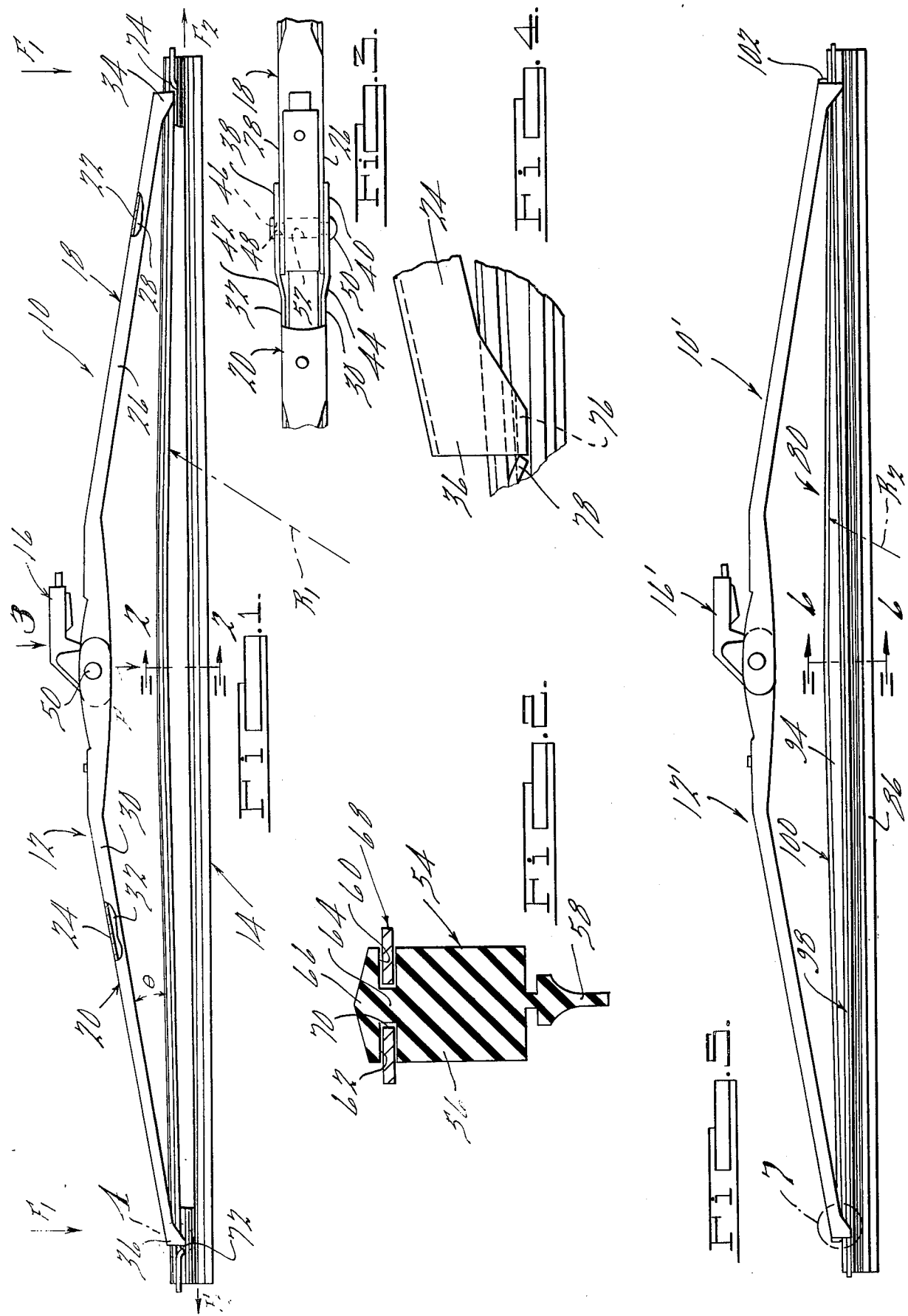

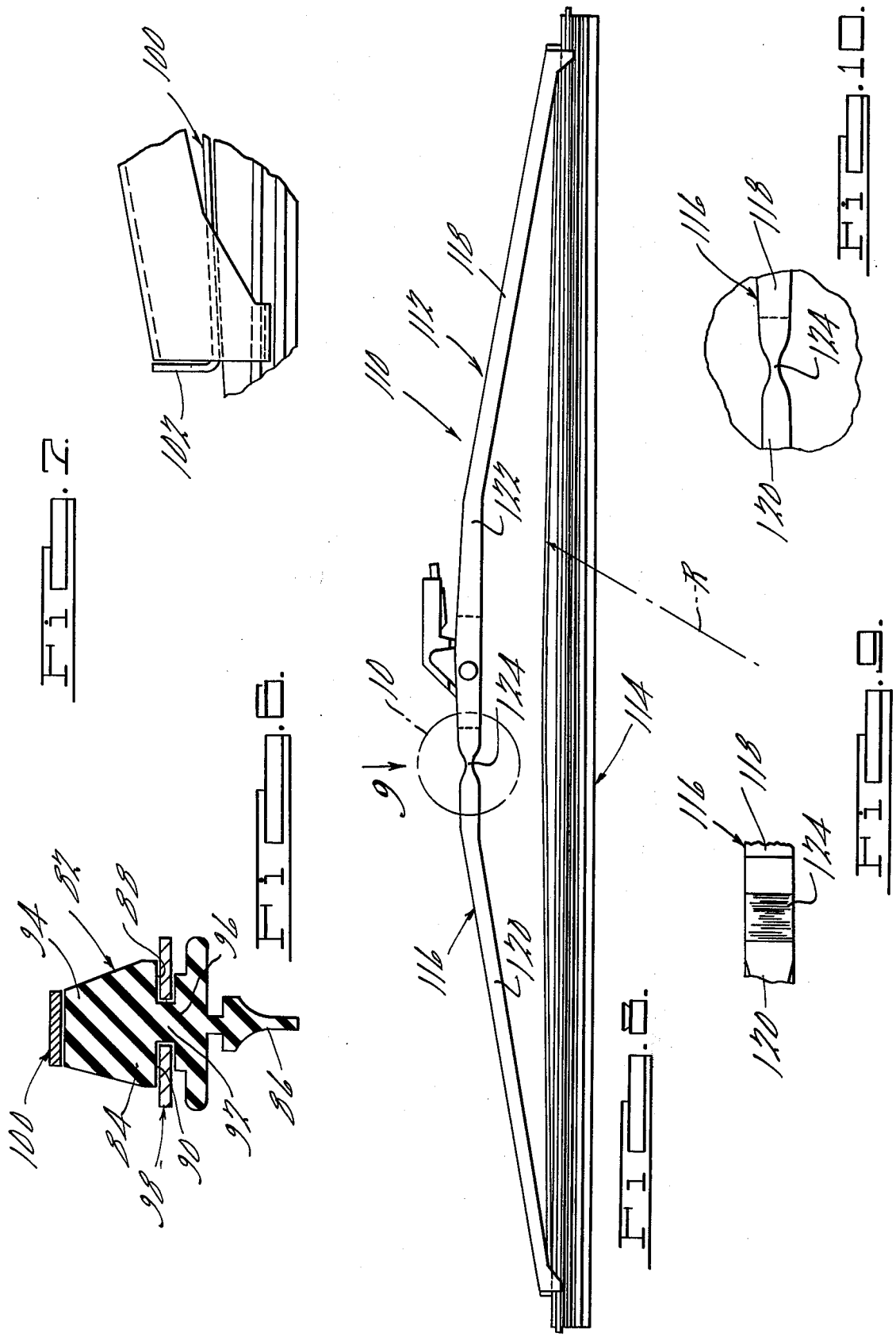

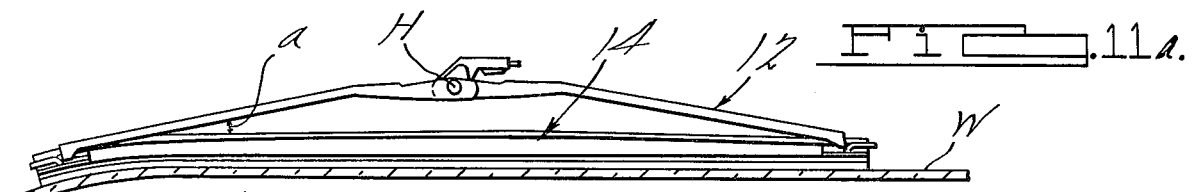
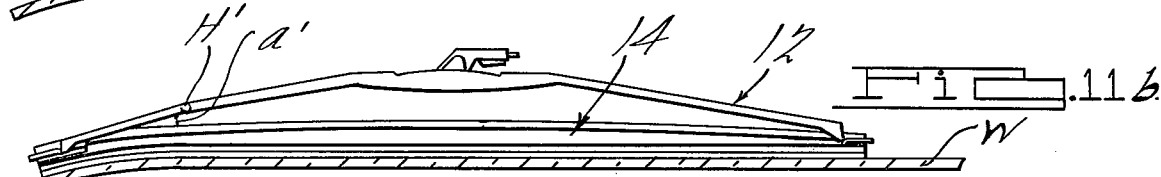
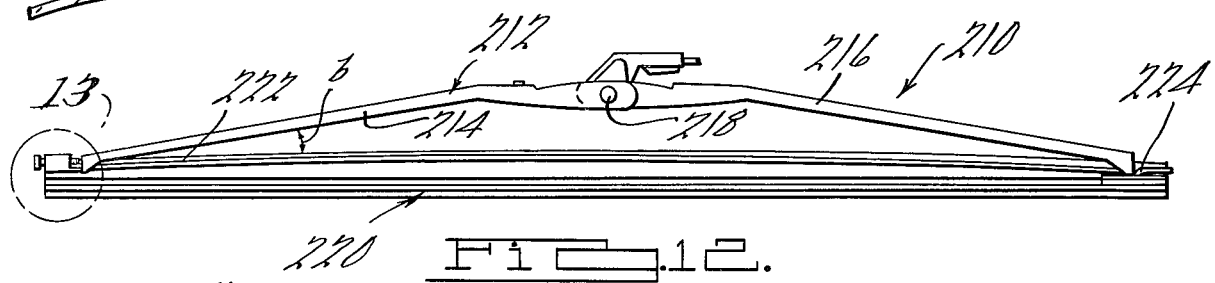
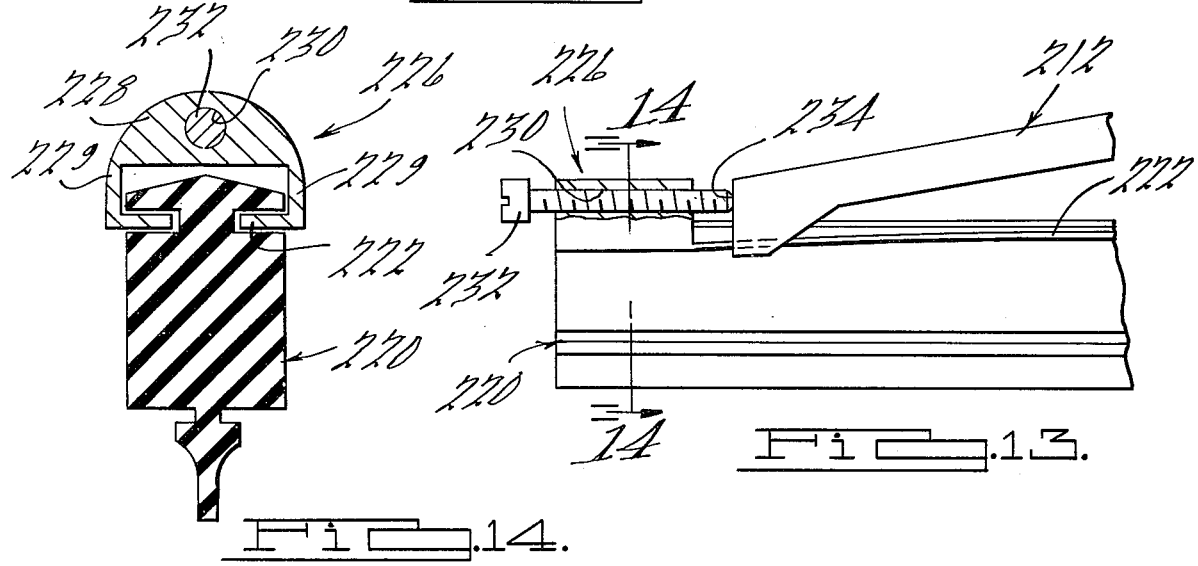
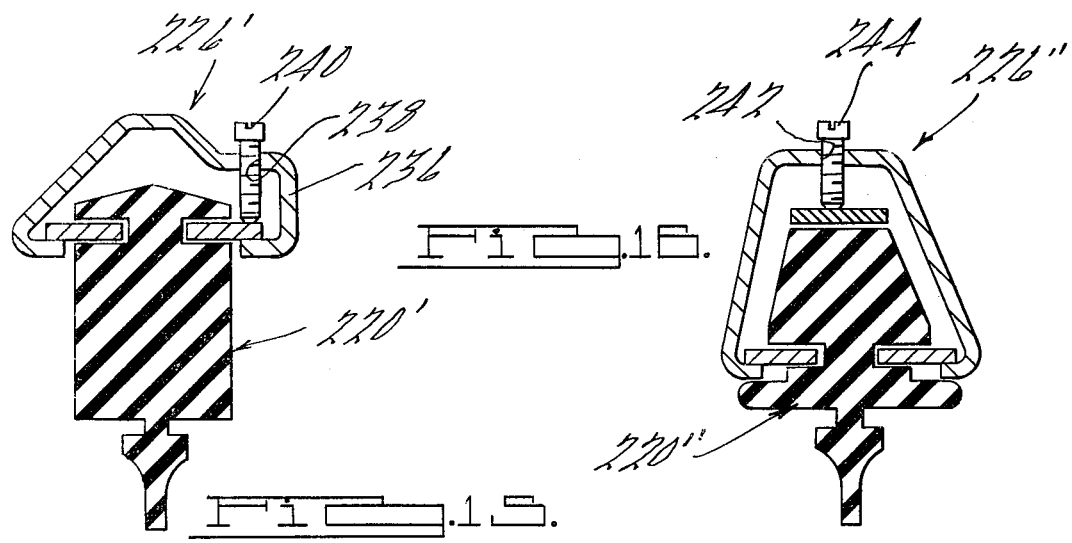

WINDSHIELD WIPER UNIT

BACKGROUND OF THE INVENTION

It is highly desirable in the design of windshield wiper blades to assure that equal pressure distribution along the entire length of the wiper blade is achieved so that optimum wiping action occurs upon movement of the blade across the associated windshield. The present method of achieving such uniform pressure distribution has been to utilize two or more link elements located at the opposite ends of the associated wiper bridge such that the applied force at each end of the bridge is in turn applied along the wiper blade at, for example, four different longitudinally spaced locations. Although certain manufacturers have gone to the extent of using three and even four of such links in order to achieve equal pressure distribution, the link concept has been found to be objectionable in view of the fact that at the ends of the respective links, a greater pressure is applied to the associated blade relative to the pressure applied in the apace between the ends of the links and the space directly beneath the bridge. Although the use of an elongated metallic flexor element has a pressure equalizing effect, the use of such an element still does not provide the desired uniform pressure application that is necessary in order to achieve optimum wiping efficiency, particularly under high wind speed conditions where the wiper blade tends to lift or raise away from the windshield. Of course, another important disadvantage of the use of the aforementioned links resides in the fact that the manufacturing time and expense is quite burdensome, with a result that the wiper blade assemblies utilizing such links are relatively expensive to purchase by the consumer.

Generally speaking, the present invention is directed toward a new and improved wiper unit which is intended to obviate the aforementioned objectionable characteristics of similar type wiping units known in the art. More particularly, the applicant's wiper blade design obviates the need for any link elements connecting the bridge assembly to the wiper blade, and at the same time, the applicant's design has been found to provide an optimum uniform pressure distribution over the entire length of the wiper blade. The applicant's improved wiper blade assembly utilizes a bridge subassembly consisting of two hingedly or pivotably connected bridge sections. The outer ends of the bridge assembly are longitudinally slidably connected to the ends of an elongated metal or flexor element; however, stop means is provided at each end of the bridge assembly for limiting such longitudinal movement of the ends of the bridge assembly relative to the flexor element. In a normal wiper blade, the flexor element extends generally parallel to the longitudinal axis of the rubber wiping element. In the applicant's invention, on the other hand, the flexor element is arranged around a segment of the circumference of an imaginary circle whose center is located on the opposite side of the wiping element from the bridge assembly. Accordingly, when the wiper blade is lying on a windshield, the flexor element assumes a generally arcuate configuration or is "bow shaped". The result of this arrangement is that the wiper arm force exerted upon a bridge assembly by the associated windshield wiper arm produces a lateral force on a flexor element which in turn results in a high pressure applied along the entire length of the flexor element. At the same time, the longitudinally opposite ends of the bridge assembly produce a downwardly directed force upon the ends of the flexor element. Accordingly, by properly choosing the angle between the flexor element and the bridge sections and the correct radius of the imaginary circle along which the flexor element lies, an optimum uniformly distributed wiping force is obtained.

The advantages of the applicant's design include extremely efficient wiper performance, as well as superior anti-windlift characteristics, as compared to prior art wiper designs. In addition, the particular construction of the applicant's design enables optimum wiping in connection with relatively curved or arcuate shaped windshields. Also, due to the fact that there are fewer parts (no links), there are fewer assembly operations and the resultant manufacturing cost of the applicant's design is considerably less than comparable units.

SUMMARY OF THE INVENTION

This invention relates generally to windshield wipers and more particularly, to a new and improved wiper design which is characterized by a uniformly distributed wiping force.

It is accordingly a general object of the present invention to provide a new and improved windshield wiper design.

It is another object of the present invention to provide a new and improved windshield wiper which is adapted to apply a uniformly distributed wiping force against an associated windshield.

It is still another object of the present invention to provide a new and improved windshield wiper unit which has considerably fewer parts than similar type designs known in the prior art.

It is a further object of the present invention to provide a new and improved windshield wiper which has superior wiping performance and anti-windlift characteristics, and which operates in an improved manner on curved windshields.

It is still another object of the present invention to provide a new and improved windshield wiper unit which may have certain component parts thereof fabricated of synthetic plastic materials or the like.

It is yet another object of the present invention to provide a new and improved windshield wiper wherein the angle between the blade and bridge sections may be adjustable to accommodate for different windshield applications.

Other objects and advantages of the present invention will become apparent from the following detailed description taken in conjunction with the accompanying drawings.

BRIEF DESCRIPTION OF THE DRAWINGS

FIG. 1 is a longitudinal side elevational view of one embodiment of the improved windshield wiper unit of the present invention;

FIG. 2 is a transverse cross sectional view taken substantially along the line 2—2 of FIG. 1;

FIG. 3 is an enlarged fragmentary top elevational view of the windshield wiper unit shown in FIG. 1;

FIG. 4 is an enlarged side elevational view of the portion of the windshield wiper unit shown within the circle 4 of FIG. 1;

FIG. 5 is a longitudinal side elevational view of an alternate embodiment of the windshield wiper of the present invention;

FIG. 6 is a transverse cross sectional view taken substantially along the line 6—6 of FIG. 5;

FIG. 7 is an enlarged fragmentary side elevational view of the portion of the structure shown within the circle 7 of FIG. 5;

FIG. 8 is a longitudinal side elevational view of yet another embodiment of the present invention;

FIG. 9 is an enlarged fragmentary top elevational view taken in the direction of the arrow 9 of FIG. 8;

FIG. 10 is an enlarged cross sectional view of the portion of the structure shown within the circle 10 of FIG. 8;

FIGS. 11a and 11b are schematic representations of the applicant's windshield wiper design, as shown in operative association with a curved windshield;

FIG. 12 is a longitudinal side elevational view of another alternate embodiment of the windshield wiper of the present invention;

FIG. 13 is an enlarged fragmentary side elevational view of a portion of the structure shown within the circle 13 of FIG. 12;

FIG. 14 is a cross-sectional view taken substantially along the line 14—14 of FIG. 13;

FIG. 15 is a transverse cross-sectional view of the blade assembly of yet another embodiment of the present invention; and FIG. 16 is a view similar to FIG. 15 and illustrates still another embodiment of the present invention.

DESCRIPTION OF THE PREFERRED EMBODIMENTS

Referring now in detail to the drawings and particularly to FIG. 1 thereof, a windshield wiper unit 10, in accordance with one preferred embodiment of the present invention, is shown generally as comprising a bridge assembly 12 and a wiper assembly 14. The bridge assembly 12 is provided with a conventional wiper arm connector element 16 which is adapted to operatively secure the unit 10 to the outer terminal end of a windshield wiper arm (not shown), whereupon pivotal or reciprocal movement of the arm back and forth across a windshield results in the wiper blade unit 10 effecting the removal of any moisture or the like accumulating thereon, as is well known in the art.

In accordance with the principles of the present invention, the bridge assembly 12 comprises a pair of bridge sections or members 18 and 20 which may be fabricated of stamped metal or the like and are of a generally U-shaped configuration in transverse section. In particular, the bridge members 18, 20 comprise upper or top sections 22 and 24, respectively and generally downwardly directed spaced, parallel side sections 26, 28 and 30, 32, respectively. The outer terminal ends of the bridge members 18, 20 are provided with claw-like portions 34 and 36, respectively, which function in a manner hereinafter to be described in operatively securing the bridge assembly 12 to the wiper assembly 14.

As best seen in FIG. 3, the inner end of the bridge member 20 is formed with a pair of spaced apart finger portions 38 and 40 which are spaced slightly laterally outwardly, as seen at 32 and 44, from the side sections 30, 32. The finger portions 38, 40 are formed with a pair of aligned apertures 46 which are adapted for alignment with a pair of similar apertures 48 formed in the side sections 26, 28 of the bridge member 18. Extending through the aligned apertures 46, 48 is a suitable connecting element pivot pin, rivet or the like, generally designated by the numeral 50 which, when operatively inserted through the apertures 46, 48, functions to hingedly or pivotably connect the bridge members 18, 20, whereby the same may pivot about an axis defined by the element 50. It will be appreciated, of course, that while the aforedescribed element 50 illustrates one desirable way of pivotably or hingedly connecting the bridge members 18, 20, various alternative ways of thus connecting the members are intended to come within the scope of the present invention. As shown in FIG. 3, the connector 16 is adapted to be operatively secured to the bridge assembly 12 at a postion adjacent the hinged or pivotal connection of the bridge members 18, 20. Toward this end, the connector 16 may be provided with a suitable bore or aperture which is adapted for alignment with the aforedescribed apertures 46, 48 and have the element 50 extend therethrough, thus operatively connecting the connector 16 to the assembly 12.

With reference to the wiper assembly 14, as best seen in FIG. 2, the assembly 14 comprises an elongated wiping element 54 fabricated of a resilient deformable material, such as rubber or the like, and which comprises a central longitudinally extending body 56 having an elongated relatively flexible wiping lip 58 formed along the lower side thereof. The body 56 is formed with a pair of elongated grooves or recesses 60, 62 along the opposite sides thereof and extending the entire length of the wiping element 54. The recesses 60, 62 define a reduced thickness neck portion 64 therebetween that integrally connects the body 56 to a head portion 66 which, like the wiping lip 58, is coextensive of the body 56. Operatively associated with the wiping element 54 is an elongated flexor element, generally designated by the numeral 68. The element 68 is preferably, although not necessarily, fabricated of a metallic material and, as shown in FIG. 2, is of a relatively thin flat cross-sectional shape. The element 68 is slightly longer than the element 54 and is formed with a central longitudinally extending slot 70 within which the neck portion 64 of the wiping element 54 is adapted to be operatively received. As shown in FIG. 2, when the neck portion 64 is disposed within the slot 70, the head portion 66 of the element 54 is located above the element 68, while the body 56 and wiping lip 58 are located therebelow, with the opposite sides of the flexor element 68 being substantially nestingly received within the slots or recesses 60, 62, whereby only the outer marginal edges of the flexor element 68 extend or project laterally beyond the outer sides of the wiping element 54. The flexor element 68 and wiping element 54 provide a unitized subassembly which may be easily removed and replaced when the wiping element 58 of the element 54 becomes worn or for any other suitable reason, as will be appreciated by those skilled in the art.

The assembly 14 comprising the wiping element 54 and flexor element 68 are adapted to be operatively secured to the bridge assembly 12 by means of the aforementioned claw portions 34, 36 forming the outer ends of the bridge members 18, 20. More particularly, the claw portions 34, 36 are slightly larger in a lateral dimension than the width of the flexor element 68 and each side of each of the claw portions 34, 36 is formed with a laterally inwardly extending tang or flange portion 76 which, when the claw portions 34, 36 are surmounted upon the wiping element 54 and flexor element 68, are adapted to extend laterally inwardly beneath the lower side of the flexor element 68, with the result that the bridge assembly 12 is secured to the wiper assembly 14, yet the outer ends of the bridge members 18, 20, i.e., claw portions 34, 36, are permitted to slide longitudinally relative to the flexor element 68. In order to limit such longitudinal sliding movement of the bridge assembly 12 relative to the wiper assembly 14, the opposite ends of the flexor element 68 are formed with downwardly deformed tab portions, generally designated by the numeral 78 and one of which is shown in FIG. 4. The tab portions 78 are adapted to engage the outer ends of the claw portions 34, 36 and thereby limit outward sliding movement of the claw portions 34, 36 relative to the flexor element 68. It will be appreciated, of course, that various other types of means for limiting sliding movement between the bridge assembly 12 and wiper assembly 14 could be utilized, such as suitable integrally formed rubber stop portions on the wiping element 54 or the like, all of which alternative stop means are intended to come within the scope of the present invention.

In accordance with the principles of the present invention, the grooves or recesses 60, 62 within the wiping element 54, and along which the flexor element 68 is disposed, are designed to lie along a segment of the circumference of an imaginary circle, the center of which is located on the opposite side of the wiping element 54 from the bridge assembly 12, the circle having a radius $R_1$, as indicated in FIG. 1. This construction differs from prior art designs wherein the grooves within which the flexor element is disposed extended parallel to the longitudinal axis of the wiping element, and results in a construction wherein the wiper assembly 14 assumes a generally arcuate configuration as defined by the aforementioned imaginary circle.

In operation of the windshield wiper unit 10 of the present invention, upon assembly thereof on an associated wiper arm, the arm produces a downwardly directed force F which is generally perpendicular to the axis of the unit 10, as indicated in FIG. 1. This force F is transmitted into forces $F_1$ via the bridge assembly 12 which is applied to the opposite ends of the wiper assembly 14. At the same time, due to the hinged connection of the bridge members 18, 20, and the stop means provided by the tab portions 78, laterally outwardly directed forces $F_2$ are exerted upon the opposite ends of the wiper assembly 14, as also indicated in FIG. 1. It has been found that through proper choice of the angle (see FIG. 1) between the bridge members 18, 20 and the axis of the wiper assembly 14, and further by appropriate choice of the radius $R_1$ along which the flexor element 68 lies, a substantially uniform wiping pressure distribution can be applied by the wiper assembly 14 along the entire length thereof to the associated windshield. Accordingly, superior wiping performance and anti-windlift characteristics can be achieved as compared to prior art designs. In addition, due to the fact that half of the arm force F, i.e., forces $R_1$, are applied at the opposite ends of the wiper assembly 14 in a direction perpendicular to the axis of the assembly 14, the assembly 14 is able to conform to a very high degree with relatively compound curved windshields so as to assure for efficient cleaning thereof, as best seen in FIG. 11a. Also, it will be appreciated that the wiper blade unit 10 of the present invention requires no links and hence fewer assembly operations are required, with the result that the unit 10 may be manufactured at a considerable savings relative to prior known devices.

Referring now to FIGS. 5 through 7, a slightly modified embodiment of the present invention is depicted as consisting of a wiper blade unit 10' which includes a bridge assembly 12', both of which assemblies are substantially identical in construction to the aforedescribed structures designated by like numerals, with the exception of the below described details. The wiper blade unit 10' includes a wiper assembly, generally designated by the numeral 80, which is similar in construction to the aforedescribed wiper assembly 14 and includes an elongated flexible wiper element 82 analogous to the aforedescribed element 54 and comprising a main body 84 having a coextensive wiping lip 86 formed along the lower side thereof. The body 84 is formed with a pair of recesses 88 and 90 along the opposite sides thereof which are parallel to the axis of the element 82 (as opposed to being arcuate shaped as in the wiper element 54 hereinabove described, which recesses 88, 90 define a reduced thickness neck portion therebetween that connects a head portion 94 of the element 82 to the body 84 thereof. As previously described, the neck portion 92 of the element 82 is adapted to be received within a central longitudinally extending slot 96 formed in a flat metallic flexor element 98 which may be of substantially the same construction as the aforedescribed flexor element 68.

The wiper element 82 also differs from the aforedescribed element 54 in that the head portion 94 thereof is of an enlarged thickness at a position intermediate the opposite ends thereof. More particularly, the upper marginal edge or surface of the head portion 94 of the element 82 is defined by an imaginary circle having its center on the opposite side of the wiper assembly 80 from the bridge assembly 12', which upper surface is defined by a radius $R_2$, as indicated in FIG. 5. An additional difference of the wiper assembly 80 from the aforedescribed assembly 14 resides in the fact that while the bridge assembly 12' is slidably mounted on the flexor element 68, no stop means, (such as the tabs 78) are provided on the element 68. Also, a second elongated flat strip of material, fabricated, for example, of metal or the like, is secured, such as by any suitable bonding means, adhesive or the like, to the upper arcuate shaped surface of the head portion 94. This additional strip of material or member is best seen in FIG. 6 and is designated by the numeral 100. By virtue of the fact that the member 100 lies along the upper surface of the head portion 94 which in turn is defined by the circle of radius $R_2$, the member 100 itself lies along the circumference of such imaginary circle. In order to transmit the downward and laterally outwardly directed forces from the bridge assembly 12' to the wiper assembly 82, means is provided on the member 100, which is engageable with the outer ends of the bridge assembly 12' by which such forces may be transmitted from the assembly 12' to the assembly 80. More particularly, the laterally outer ends of the member 100 are preferably turned upwardly to define tab sections 102 that are located directly longitudinally outward from the outer ends of the bridge assembly 12'. The tab sections 102 are adapted to be engaged by the outer ends of the bridge assembly 12', whereby the member 100 will function essentially in the same manner as the aforedescribed flexor element 68 in causing a uniform pressure distribution of the wiping element 82 upon the associated windshield.

With reference now to FIGS. 8 through 10, still another embodiment of the present invention is shown as comprising a windshield wiper unit 110 having a bridge assembly 112 and a wiper assembly 114. The wiper assembly 114 may be the same or similar in construction to either of the hereinabove described wiper assemblies 14 or 80 and is depicted herein, merely by way of example, as being of the same general construction as the assembly 80. That is, the wiper assembly 114 includes a flexor element, such as the element 82 and another elongated member analogous to the member 100 which lies along the circumferences of an imaginary circle having a radius R, as shown in FIG. 8. The wiper unit 110 differs from the units 10 and 10' in that the bridge assembly 112 thereof is fabricated of a one piece construction, as opposed to consisting of a pair of pivotally connected bridge members. More particularly, the bridge assembly 112 comprises a one piece bridge member 116 including a pair of bridge sections 118 and 120. The member 116 is of a monolithic structure and is preferably fabricated of a synthetic plastic material, such as polyproplyene. The bridge section 118 includes a generally horizontally disposed connector section 122 which is arranged generally parallel to the longitudinal axis of the wiper assembly 114 and is integrally connected to the sections 118, 120. In accordance with the principles of the present invention, the bridge sections 118, 120 are adapted to be hingedly connected to one another so as to provide for relative pivotal movement therebetween in much the same manner as the bridge members 18 and 20 pivoted in the bridge assembly 12 hereinabove described. Toward this end, the one piece bridge member 116 is provided with a reduced cross sectional size or thickness hinge portion, generally designated by the numeral 124, which is adapted to permit relative pivotal or hinged movement of the sections 118, 120 with respect to one another. Accordingly, at such time as a downwardly directed wiper arm force F is applied via the associated connector to the bridge assembly 112, the bridge sections 118, 120 will cause said force to be directed to the wiper assembly 114 in a manner hereinabove described so as to provide a uniformly distributed wiping force along the entire length of the assembly 114.

For certain applications, particularly where it is desirable to remove the moisture from a relatively curved windshield, it may be desirable to locate the pivotal axis of the bridge members adjacent the outer end of the bridge assembly. More particularly, as shown in FIGS. 11a and 11b, for most normal applications, the pivot or hinge H for the bridge members of the bridge assembly may be located at the center of the assembly 12, as shown in FIG. 11a. With this arrangement, an angle a is defined between the bridge members and the associated blade assembly 14. While this arrangement is satisfactory for relatively flat or planar windshields W, where the windshield W is of a more arcuate configuration as shown in FIG. 11b, it is desirable to have a greater angle a' between the adjacent end of the bridge assembly 12 and the blade assembly 14. Accordingly, by locating the hinge or pivotal connection, as seen at H' adjacent the outer end of the bridge assembly which is closest to the curved portion of the windshield, a greater wiping efficiency is achieved since the blade assembly 14 will conform to a much greater degree to the curved windshield than if the hinge connection is located generally centrally of the bridge assembly 12.

In accordance with the present invention, it may be desirable to provide some means on the wiper unit so that the angle between the ends of the bridge assembly and the blade assembly may be varied to accommodate different applications. Toward this end, a windshield wiper blade unit 210 shown in FIG. 12 comprises a bridge assembly 212 consisting of bridge sections or members 214, 216 pivotally connected to one another by suitable pivot or hinge means 218. The bridge assembly 212 is associated with a blade assembly 220 which may be of the same general construction as the afore-described blade assembly 14 and includes an elongated flexor element 222. As in the previously described embodiments of the present invention, the bridge assembly is longitudinally slidably mounted on the flexor element 222, with suitable stop means 224 being provided to limit longitudinal sliding movement of the bridge assembly 212 toward the right in FIG. 12. In accordance with the present invention, adjustment means generally designated by the numeral 226 is mounted on the opposite end of the blade assembly 220 from the stop means 224 and is adapted to function in selectively longitudinally positioning the end of the bridge member 214 along the flexor element 222, whereby to control the angle b defined between the ends of the assembly 212 and the blade assembly 220. It will be appreciated, of course, that the adjustment means may take any one of a number of forms; however, by way of example, the adjustment means 226 is shown as comprising a housing or body 228 disposed above the blade assembly 220 and fixedly secured adjacent the outer end of the flexor element 222 by means of a pair of upstanding let portions 229. The body 228 is formed with an internally threaded bore 230 extending parallel to the axis of the blade assembly 220 and having a suitable screw, bolt or the like threadably received therewithin. As best seen in FIG. 13, the adjustment member 232 is engageable with the outer end 234 of the bridge assembly 212 and may be threadably advanced or retracted relative to the body 228 to vary the position which the adjacent end of the bridge assembly 212 assumes along the flexor element 222. It will be noted that the end 234 of the assembly 212 will be maintained in engagement with the member 232 due to the downward force applied by the associated wiper arm. With this arrangement, the angle b between the ends of the bridge assembly 212 and the wiper assembly 220 may be conveniently changed to adapt a single wiper unit for a wide variety of windshield configurations, thus providing for universality of application, as compared to prior art wiper designs.

FIGS. 15 and 16 illustrate slightly modified constructions of the adjustment means 226 shown in FIGS. 13 and 14. In the construction shown in FIG. 15, an adjustment means 226' is shown as comprising an outwardly projecting section 236 formed on the associated end of the bridge member, which portion 236 is formed with a generally vertical threaded bore 238 adapted to threadably receive an adjustment member or screw 240. As illustrated, the bridge member is adapted to slid longitudinally of the associated flexor element and at such time as the end of the bridge assembly is located at the desired position at the blade assembly, the member 240 can be threadably advanced to lockingly engage a portion of the associated flexor element, thus providing for the desired adjustability. The adjustment means 226″ shown in FIG. 16 is shown in operative association with a wiper assembly 220″ similar to the wiper assembly 80 shown in FIG. 5. In this construction, the associated end of the bridge assembly is formed with a vertical bore 242 having a threaded adjustment member 244 therein adapted for locking engagement with the upper side of the metallic strip, such as the strip 100, mounted on top of the wiper assembly 220″. As previously mentioned, various alternative adjustment means may be provided without departing from the scope or fair meaning of the present invention.

It will be seen from the foregoing that the present invention provides a novel windshield wiper unit wherein a uniformly distributed wiping force is provided along the entire length of the wiper assembly. Such a uniform force is achieved without the need of the various links and other costly components heretofore required in similar type wiper units known in the art. By virtue of the extreme simplicity of construction and superior wiping performance of the applicants' wiper unit, said unit will find wide and varied acceptance, will have a long operational life, and may be manufactured and assembled in an extremely economical manner.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A windshield wiper unit comprising
a wiper assembly including a relatively flexible wiper blade,
a bridge assembly disposed adjacent said wiper assembly for operatively securing the same to an associated wiper arm,
said bridge assembly including first and second hingedly connected bridge sections,
an elongated strip of material extending between the ends of said wiper assembly and generally coextensive thereof, the opposite ends of said bridge assembly bearing against the opposite ends of said strip of material and applying opposed outwardly directed forces on said ends of said material, and
means including said wiper assembly supporting a portion of said strip of material intermediate said ends thereof in a generally arcuate configuration whereby a downwardly and outwardly directed force exerted by said bridge assembly upon the opposite ends of said blade assembly will result in said wiper blade applying a relatively uniformly distributed wiping force along the entire length thereof against an associated windshield.

2. The invention as set forth in claim 1 wherein said bridge assembly includes first and second bridge sections and means pivotably connecting said sections, whereby said sections are pivotable relative to one another about an axis extending generally transversely of the wiper unit.

3. The invention as set forth in claim 1 wherein said bridge assembly is of a one-piece monolithic structure and includes a portion thereof intermediate the opposite ends thereof for permitting relative pivotal movement between said ends.

4. The invention as set forth in claim 3 wherein said one-piece bridge member includes a reduced thickness portion providing relative pivotal movement between said ends thereof.

5. The invention as set forth in claim 4 wherein said one-piece bridge member is fabricated of a synthetic plastic material.

6. The invention as set forth in claim 1 wherein said wiper blade includes a relatively enlarged cross section portion intermediate the opposite ends thereof for applying a relatively uniformly distributed wiping force along the entire length of said blade.

7. The invention as set forth in claim 1 wherein said strip of material is an arcuate-shaped member, said member being secured to said blade and having an intermediate portion thereof spaced further away from the windshield than the opposite ends thereof and adapted to cause the blade to apply a relatively uniform wiping force along the entire length thereof against the windshield.

8. The invention as set forth in claim 1 wherein said blade comprises an enlarged cross section portion intermediate the opposite ends thereof and said strip of material comprises an elongated arcuate-shaped member secured to said blade and has an intermediate portion thereof spaced further away from the windshield than the opposite ends thereof and cooperable with said enlarged cross section portion for producing a relatively uniform wiping force along the entire length of the blade.

9. The invention as set forth in claim 8 wherein said elongated arcuate-shaped member comprises a flexor element fabricated of a flat resilient material and having an elongated slot formed therein, and wherein said wiper blade comprises an upper head portion connected to a lower wiping lip portion by a reduced thickness neck portion, and wherein said neck portion of said wiper blade extends through said slot in said flexor element.

10. The invention as set forth in claim 9 wherein said wiper blade is formed with a pair of elongated slots along the opposite side thereof, said slots being defined in part by an imaginary circle having its center on the opposite side of said blade from said bridge assembly.

11. The invention as set forth in claim 10 wherein at least one end of said bridge assembly is longitudinally slidably connected to said flexor element, and which includes stop means for limiting said longitudinal movement of said one end of said bridge assembly relative to said flexor element.

12. The invention as set forth in claim 11 wherein said stop means includes means on said flexor element and extending generally perpendicular thereto and adapted for engagement with the opposite ends of said bridge assembly.

13. The invention as set forth in claim 1 wherein said wiper blade is defined in part by an imaginary circle having its center located on the opposite side thereof from said bridge assembly, whereby an intermediate portion of said wiper blade located between the opposite ends of said bridge assembly is of a relatively enlarged cross section relative to the cross sectional size of the opposite ends of said blade, and wherein said strip of material is secured to the upper side of said wiper blade and lying generally along the circumference of said imaginary circle, and wherein said elongated strip of material has the opposite ends thereof operatively secured to the opposite ends of said bridge assembly, whereby a downwardly and outwardly directed force exerted against the opposite ends of said member result in said member exerting a relatively uniformly distributed force against said wiper blade.

14. The invention as set forth in claim 13 which includes first and second elongated metallic members generally coextensive of said wiper blade, one of said metallic members lying along the circumference of said circle, and the other of said members being generally linearly aligned with said wiper blade, and wherein the opposite ends of said bridge assembly are longitudinally slidably connected to one of said members.

15. A windshield wiper unit comprising
a wiper assembly including an elongated, relatively flexible wiper blade having a wiping lip portion,
a bridge assembly disposed adjacent said wiper assembly for operatively securing the same to an associated wiper arm,
said bridge assembly comprising first and second pivotably connected sections,
means adjacent the opposite ends of said wiper assembly for operatively connecting the opposite ends of said bridge assembly thereto,
an elongated force applying element having its ends directly connected to the opposite ends of said bridge assembly, and
means supporting said element at a position arranged non-parallel to said wiping lip portion of said wiper assembly,
said last mentioned means including a relatively enlarged cross section portion of said blade located intermediate said opposite ends of said wiper assembly.

16. The invention as set forth in claim 15 wherein said bridge assembly includes first and second bridge sections arranged in end-to-end abutting relation, and which further includes means pivotably connecting said sections together at the confronting ends thereof.

17. The invention as set forth in claim 16 wherein said sections are pivotable relative to one another about an axis extending generally transversely of the axis of said wiper unit.

18. The invention as set forth in claim 16 wherein said bridge assembly is of a one-piece monolithiic structure and includes a portion thereof intermediate the opposite ends thereof for permitting relative pivotal movement between said ends.

19. The invention as set forth in claim 18 wherein said one-piece bridge member is fabricated of a synthetic plastic material.

20. The invention as set forth in claim 15 wherein said force applying element comprises a flexor element fabricated of a flat resilient material having an elongated slot formed therein, and wherein said wiper blade comprises an upper head portion connected to a lower wiping lip portion by a reduced thickness neck portion, and wherein said neck portion of said wiper blade extends through said slot in said flexor element.

21. The invention as set forth in claim 20 wherein said wiper blade is formed with a pair of elongated slots along the opposite sides thereof, said slots being defined in part as lying along the periphery of an imaginary circle having its center on the opposite side of said blade from said bridge assembly.

22. The invention as set forth in claim 15 wherein said wiper blade is defined in part by an imaginary circle having a center located on the opposite side thereof from said bridge assembly, whereby an intermediate portion of said wiper blade located between the opposite ends of said bridge assembly is of a relatively enlarged cross section size relative to the cross-sectional size of the opposite ends of said blade, and which includes an elongated strip of material secured to the upper side of said wiper blade and lying generally along the circumference of said imaginary circle, and wherein said elongated strip of material has the opposite ends thereof operatively secured to the opposite ends of said bridge assembly, whereby a downwardly and outwardly directed force exerted against the opposite ends of said member result in said member exerting a relatively uniformly distributed force against said wiper blade.

23. The invention as set forth in claim 22 which includes first and second elongated metallic members generally coextensive of said wiper blade, one of said metallic members lying along the circumference of said circle and the other of said members being generally linearly aligned with said wiper blade, and wherein the opposite ends of said bridge assembly are longitudinally slidably connected to one of said members.

24. A windshield wiper unit comprising
a wiper assembly including a relatively flexible wiper blade adapted to be moved across an associated windshield,
a bridge assembly disposed adjacent said wiper assembly for operatively securing the same to an associated wiper arm,
means providing for relative pivotal movement between the opposite ends of said bridge assembly,
means adjacent the opposite ends of said wiper assembly for operatively connecting the opposite ends of said bridge assembly thereto, and
an elongated, generally arcuate-shaped member secured to said blade,
said member having an intermediate portion thereof spaced further away from the windshield than the opposite ends thereof and adapted to cause said wiper blade to apply a relatively uniform wiping force along the entire length thereof against the windshield.

25. The invention as set forth in claim 24 wherein said bridge assembly includes first and second bridge sections arranged in end-to-end abutting relation, and which further includes means pivotably connecting said sections at the confronting ends thereof.

26. The invention as set forth in claim 25 wherein said sections are pivotable relative to one another along an axis extending generally transversely of the axis of said wiper unit.

27. The invention as set forth in claim 25 wherein said bridge assembly is of a one-piece monolithic structure and includes a portion thereof intermediate the opposite ends thereof for permitting relative pivotal movement between said ends.

28. The invention as set forth in claim 27 wherein said one-piece bridge member is fabricated of a synthetic plastic material.

29. The invention as set forth in claim 24 which includes a flexor element fabricated of a flat resilient material having an elongated slot formed therein, and wherein said wiper blade comprises an upper head portion connected to a lower wiping lip portion by a reduced thickness neck portion, and wherein said neck portion of said wiper blade extends through said slot in said flexor element.

30. The invention as set forth in claim 29 wherein said wiper blade is formed with a pair of elongated slots along the opposite sides thereof, said slots being defined in part as lying along the periphery of an imaginary circle having its center on the opposite side of said blade from said bridge assembly.

31. The invention as set forth in claim 29 which includes first and second elongated metallic members generally coextensive of said wiper blade, one of said metallic members lying along the circumference of said circle, and the other of said members being generally linearly aligned with said wiper blade, and wherein the opposite ends of said bridge assembly are longitudinally slidably connected to one of said members.

32. The invention as set forth in claim 31 which includes interengageable means on said bridge assembly and said second elongated member cooperable to apply a relatively uniformly distributed wiping force along said wiper blade in response to a downwardly and outwardly directed force being exerted by said bridge assembly upon the opposite ends of said wiper blade.

33. The invention as set forth in claim 32 wherein said interengageable means comprises the opposite ends of said second elongated member being turned upwardly and adapted for engagement with the opposite ends of said bridge assembly, and wherein said bridge assembly is longitudinally slidably secured to said first elongated member.

34. A windshield wiper unit comprising
a wiper assembly including a relatively flexible wiper blade,
a bridge assembly disposed adjacent said wiper assembly for operatively securing the same to an associated wiper arm,
said bridge assembly including first and second hingedly connected bridge sections,
a force applying element on said wiper element and arranged along a generally arcuate path, and
means for adjustably connecting said bridge assembly to said wiper assembly in a manner such that at least one end of said bridge assembly may move longitudinally relative to said force applying element.

35. The invention as set forth in claim 34 wherein said bridge assembly includes first and second bridge sections and means pivotably connecting said sections, whereby said sections are pivotable relative to one another along an axis extending generally transversely of the axis of said wiper unit.

36. The invention as set forth in claim 34 wherein said bridge assembly is of a one-piece monolithic structure and includes a portion thereof intermediate the opposite ends thereof for permitting relative pivotal movement between said ends.

37. The invention as set forth in claim 36 wherein said one-piece bridge member includes a reduced thickness portion providing relative pivotal movement between said ends thereof.

38. The invention as set forth in claim 37 wherein said one-piece bridge member is fabricated of a synthetic plastic material.

39. The invention as set forth in claim 34 wherein said wiper blade includes a relatively enlarged cross section portion intermediate the opposite ends thereof for applying a relatively uniformly distributed wiping force along the entire length of said blade.

40. The invention as set forth in claim 34 which includes an elongated arcuate-shaped member, said member being secured to said blade and having an intermediate portion thereof spaced further away from the windshield on the opposite ends thereof and adapted to cause the blade to apply a relatively uniform wiping force along the entire length thereof against the windshield.

41. The invention as set forth in claim 34 wherein one end of said bridge assembly is relatively fixedly secured to said blade and the opposite end of said bridge assembly is longitudinally adjustable along said blade, and which includes means for securing said opposite end of said bridge assembly at preselected longitudinal positions along said blade.

42. The invention as set forth in claim 24 which includes an elongated flexor element on said blade, wherein the opposite ends of said bridge assembly are longitudinally slidably connected to said flexor element, and which includes threadable means for selectively longitudinally positioning one end of said bridge assembly relative to said flexor element, whereby to vary the angle between the ends of said bridge assembly and said blade.

* * * * *